D. F. GATES.
HARROW.
APPLICATION FILED AUG. 20, 1913.
1,114,462.
Patented Oct. 20, 1914.
2 SHEETS—SHEET 1.
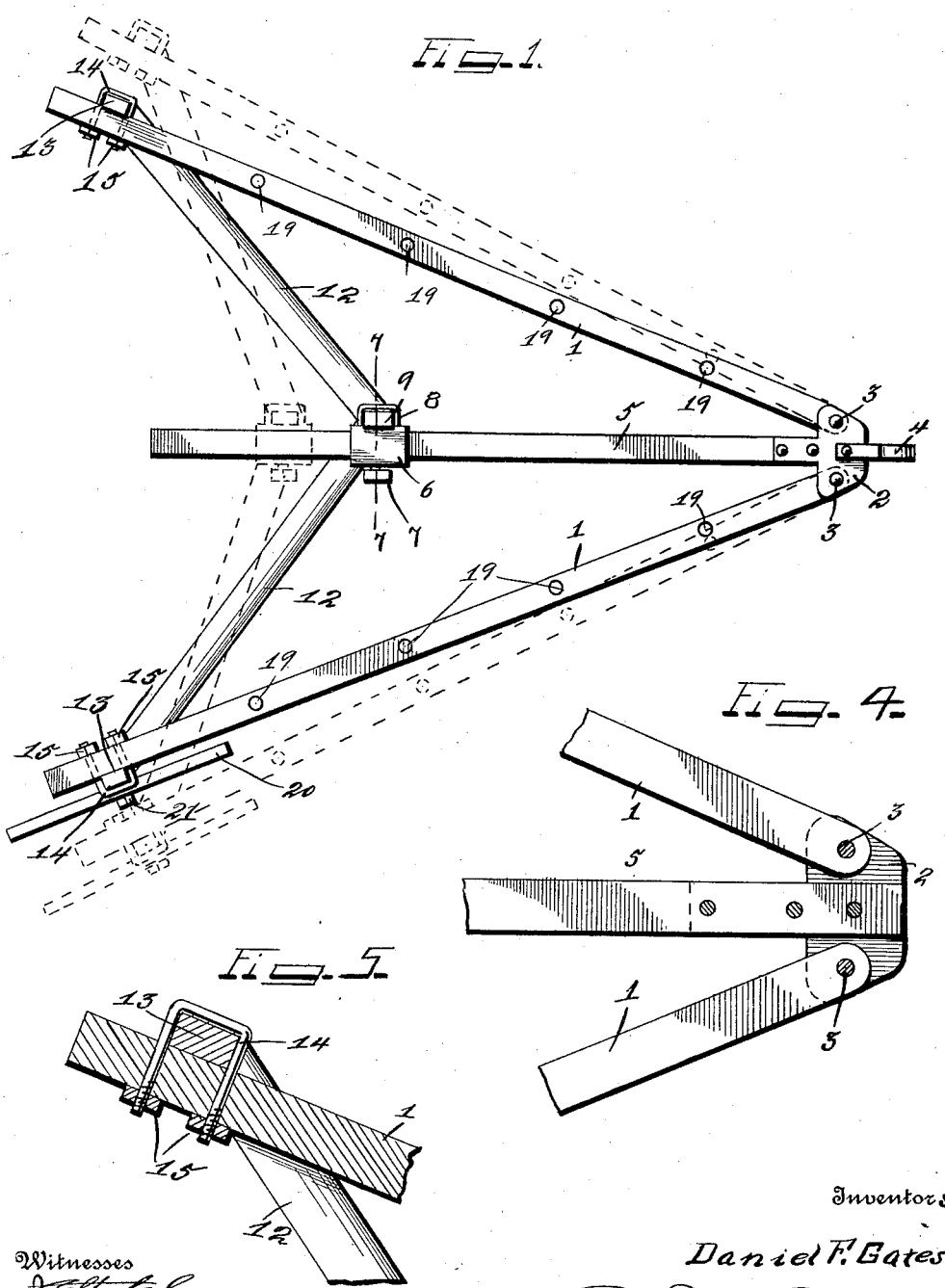
Witnesses
Inventor
Daniel F. Gates
By E. E. Vrooman,
their Attorney.

D. F. GATES.
HARROW.
APPLICATION FILED AUG. 20, 1913.
1,114,462.
Patented Oct. 20, 1914.
2 SHEETS—SHEET 2.
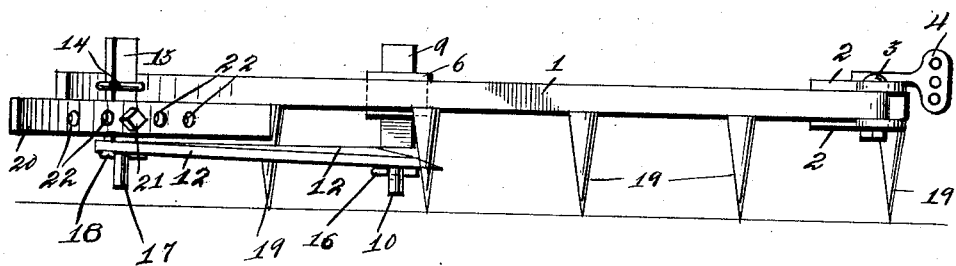
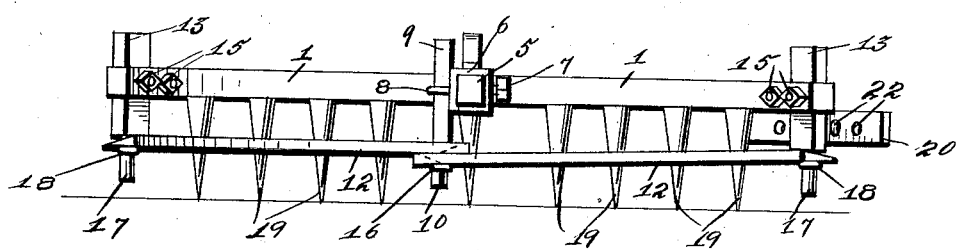
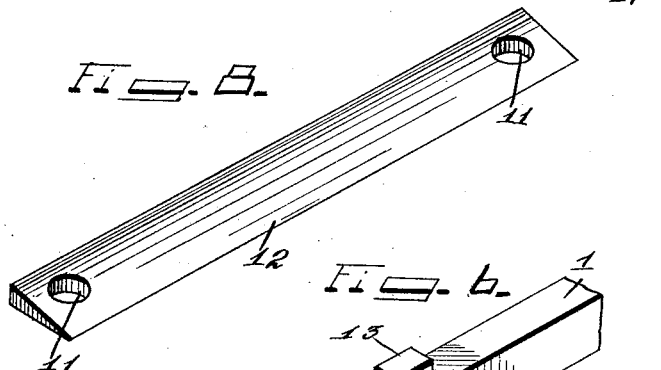
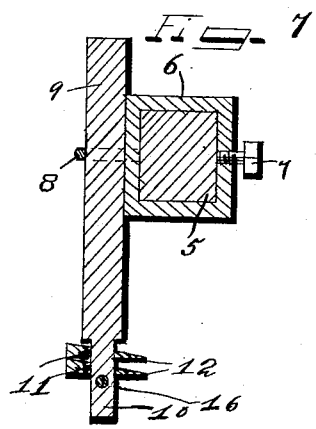
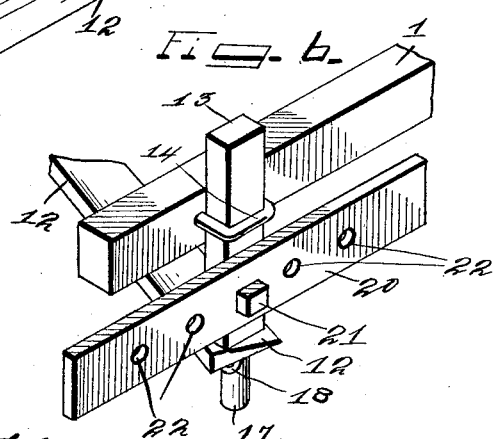
Witnesses
L. E. Strobel.
Irv. L. McCathran.
Inventors
Daniel F. Gates
By E. E. Vrooman,
their Attorney.

UNITED STATES PATENT OFFICE.

DANIEL FINIS GATES, OF FRUIT HILL, KENTUCKY, ASSIGNOR OF ONE-HALF TO L. R. DAVIS, OF CROFTON, KENTUCKY.

HARROW.

1,114,462.   Specification of Letters Patent.   Patented Oct. 20, 1914.

Application filed August 20, 1913. Serial No. 785,765.

*To all whom it may concern:*

Be it known that I, DANIEL FINIS GATES, citizen of the United States, residing at Fruit Hill, in the county of Christian and State of Kentucky, have invented certain new and useful Improvements in Harrows, of which the following is a specification, reference being had therein to the accompanying drawing.

This invention relates to harrows and has for its object the production of an efficient means whereby a field which has been planted with corn or other crop may be efficiently harrowed to cut out grass or other growing weeds.

Another object of the invention is the production of a simple and efficient harrow which may be adjusted to different widths and still perform the desired function by cuting out weeds and grass between the rows of crops which have been sown.

With the above and other objects in view this invention consists of certain novel combinations, constructions and arrangements of parts as will be hereinafter fully described and claimed.

In the accompanying drawings:—Figure 1 is a top plan view of the harrow. Fig. 2 is a side elevation thereof. Fig. 3 is a rear elevation of the harrow. Fig. 4 is a horizontal section of the front portion of the harrow. Fig. 5 is a horizontal section of the rear portion of one side of the harrow. Fig. 6 is a detail perspective of the rear end of one side of the harrow. Fig. 7 is a section taken on line 7—7, of Fig. 1. Fig. 8 is a detail perspective of one of the cutting blades carried by the harrow.

By referring to the drawings it will be seen that the harrow comprises the usual side bars 1 which are pivotally connected to a front plate 2 by means of pivot bolts 3. A draft link 4 is connected to the plate 2 in such a manner as to allow the harrow to be attached to a draft means. A rearwardly extending bar 5 is carried centrally of the plate 2 and extends intermediate the side bars 1 and carries a slidable collar 6 as is clearly illustrated in Fig. 1. This collar 6 is rectangular in cross section and carries a bolt 7 which is adapted to engage the side of the bar 5 for holding the collar 6 in an adjusted position. This collar 6 is provided with a substantially U-shape eye 8, which eye fits over a depending rod 9 whereby the rod 9 may be firmly held in engagement with the collar 6. The depending rod 9 is provided with a reduced portion or depending stem 10, which stem passes through one of the apertures 11 formed in the cutting blades 12 for pivotally connecting the inner ends of the cutting blades 12 to the rod 9. The opposite ends of the cutting blades 12 are connected to the depending rods 13 which depending rods 13 are held upon the rear ends of the side bars 1 by means of U-shape bolts 14. These U-shape bolts 14 may be tightened upon the rods 13 by means of the nuts 15 as is clearly illustrated in Fig. 1. It, of course, should be understood that the cutting blades 12 are provided with apertures at each end so as to allow the respective rods 9 and 13 to be readily secured thereto. A cotter pin 18 is passed through the reduced or depending portion 17 of the rod 13 to hold the cutting blade 12 in engagement therewith and a cotter pin 16 is also passed through the depending portion 10 of the rod 9 for holding the cutting blades 12 in engagement with the rod 9.

It should be understood that by sliding the sleeve 6 longitudinally of the rod 5 the side bars 1 may be drawn inwardly or spread outwardly to the position shown in dotted lines to accommodate themselves to the different width rows of crops which have been sown, such as for instance corn.

The cutting blades 12 are provided with sharp forward edges and the blades are overlapped at their inner ends as illustrated in Fig. 3, and these blades are adapted to cut the grass between the rows after the ground has been harrowed by means of the harrow teeth 19 carried by the side bars 1. These harrow teeth 19 may be formed of any desired structure so long as they perform the desired function.

A covering plate 20 is carried by one of the depending rods 13 and is held thereon by means of a bolt 21 fitting in one of the adjusting apertures 22, and this rod is placed just above the cutting blade 12 so as to allow the dirt which has been thrown up by means of the harrow teeth to be piled against the row of corn or other crops which have been sown in rows.

From the foregoing description it will be seen that a very efficient means has been produced for harrowing the ground between the rows of crop and at the same time cutting the grass and weeds which may have grown between the rows and piling the dirt upon the roots of the plants which have been sown so as to cover up the grass which has been growing, and in this way fertilizing the earth piled around the roots of the plant. In actual operation the harrow is adjusted so as to extend only the distance between the two rows of plants or crop and by drawing the harrow forwardly the teeth 19 will dig up the earth, the knives 12 cutting the weeds and grass and the scraper 20 piling the dirt or earth against the roots of the plant.

Having thus described the invention what is claimed as new, is:—

1. In a harrow the combination with a frame provided with a plurality of pivotally mounted side bars, of cutting blades pivotally secured thereto, a centrally located bar carried by said harrow, means for pivotally connecting said blades to said centrally located bar, and a scraper member carried by the rear end of one of said side bars.

2. In a harrow the combination with a frame provided with a plurality of pivot side bars, a centrally located bar, a sleeve adjustably mounted upon said centrally located bar, a depending rod carried by said sleeve and provided with a reduced portion, a depending rod carried by the rear end of each side bar, means for holding said last mentioned rod in engagement with said side bars, and cutting blades connected to said last mentioned rods and to said first mentioned rod.

3. In a harrow the combination with a frame provided with a plurality of side bars, a centrally located bar, depending rods carried by said side bars, a depending rod carried by said central bar, an adjustable sleeve carried by said central bar, depending rods carried by said side bars, cutting blades carried by said depending rods, and a scraper carried by one of said side bars.

4. In a harrow the combination with a frame, said frame provided with a plurality of side bars, a centrally located bar, a plurality of knives pivotally secured to said side bars and said centrally located bar, a depending rod carried by one of said side bars, and an adjustable scraper carried by said depending rod for piling the earth after the same has been scraped by means of said harrow.

In testimony whereof I hereunto affix my signature in presence of two witnesses.

DANIEL FINIS GATES.

Witnesses:
L. R. DAVIS,
D. B. PAYTON.

Copies of this patent may be obtained for five cents each, by addressing the "Commissioner of Patents, Washington, D. C."